3,070,585
POLYMERIZATION METHOD
Eli Perry, Galveston, Tex., assignor to Monsanto Chemical Company, St. Louis, Mo., a corporation of Delaware
No Drawing. Filed Apr. 17, 1959, Ser. No. 807,016
2 Claims. (Cl. 260—93.5)

This invention relates to a process for improving the properties of polymerization products from vinyl aromatic hydrocarbons.

Thermoplastic polymers of vinyl aromatic hydrocarbons have a tendency toward discoloring upon heating or upon prolonged exposure to light. It has been observed, for instance, that polystyrene frequently possesses an undesirable yellow color or fluorescence when monomeric styrene is polymerized in bulk in any usual way, e.g., by heating styrene monomer in a closed container at temperatures between 80° C. and 150° C. until the polymerization is 90 percent complete and thereafter heating the mass to higher temperatures such as those in the range of from 200° C. to 260° C. to polymerize the remainder of the monomer. The yellow color is usually concentrated in the polymer near the surface in contact with vapor or any gases in the polymerization vessel and appears to be dependent for the most part on the amount of air which is in contact with or is dissolved in the monomeric styrene which is polymerized.

It has now been discovered that the tendency of a thermoplastic polymer of a vinyl aromatic hydrocarbon to instability upon exposure to heat and light can be overcome by polymerizing said vinyl aromatic compound in the presence of small amounts of certain organometallic compounds which function as scavengers for the traces of oxygen which might be present in the monomer or in the system. According to the invention, vinyl aromatic hydrocarbon monomers are polymerized either thermally or in the presence of free-radical-type polymerization catalysts and under a substantially inert atmosphere after there has been incorporated in said monomers a small amount of an organometallic compound of the general formula $$R_1-M-R_3$$
$$|$$
$$R_2$$

in which M represents a metal which may be aluminum, boron, gallium, indium, phosphorus, arsenic, antimony or bismuth, $R_1$ and $R_3$ may be hydrogen or alkyl or aryl radicals and $R_2$ may be alkyl or aryl when M is aluminum or boron, or alkyl only when M is gallium, indium, phosphorus, arsenic, antimony or bismuth. The polymer thus produced has significantly better stability with respect to heat and light than does polymer produced by conventional polymerization techniques.

The following examples are given to illustrate the invention but are not to be construed as limiting it in any manner.

EXAMPLE 1

A group of experiments were conducted in which styrene containing very small quantities of triisobutylaluminum and styrene alone was thermally polymerized. The styrene used was typical of the standard commercial grade available to polymer manufacturers. The monomer or monomer and additive mixture was charged into a drawn-out, 25 x 200 mm. test tube under an atmosphere of argon. The contents of the tube was frozen in Dry Ice and the tube was sealed off under vacuum. The tube was then allowed to warm up until the contents had thawed, then it was placed in an oil bath maintained at a temperature of about 104° C. for a period of about 6 hr. At the end of this time, the tube was removed, cooled in water, and its contents frozen by immersion in Dry Ice. The tube was then broken open and its contents allowed to thaw. The contents of the tube was poured into six volumes of methanol to precipitate the polymer present. The resulting mixture was filtered, the precipitated polymer was washed with methanol, air-dried and then oven-dried at 58° C.

Specimens of each of the polymers were compression-molded into small slabs and tested for yellowness. The molded specimens were then exposed for a period of seven days to the following environments: (1) circulating air oven at 70° C.; (2) a battery of fluorescent sun lamps having maximum emission at 3100 A.; and (3) a Uviarc. Yellowness of each specimen was again measured after exposure. For greater precision, all measurements were made using the standard procedure on the "Color-Eye," an instrument manufactured by Instrument Development Laboratories. Yellowness was computed by the SPI-IES formula for compensating for differences in opacity $$Y = \frac{R_{680} - R_{420}}{R_{560}}$$

The numerical value obtained represents a direct measure of yellowness, i.e., an increase in numerical value indicates an increase in intensity of yellow color. Results are presented in Table 1 together with the amount of styrene and triisobutyl aluminum used, respectively, in producing each polymer tested.

Table I

| | Starting materials | | Polymeric product yellowness | | | | | |
|---|---|---|---|---|---|---|---|---|
| Run No. | Styrene (g.) | Triisobutyl-aluminum (g.) | Oven exposure | | Fluorescent light exposure | | Uviarc exposure | |
| | | | Initial | Final | Initial | Final | Initial | Final |
| D | 77 | None | 16.6 | 18.4 | 16.9 | 58.5 | 16.9 | 64.3 |
| F | 122 | 0.1 | 13.4 | 14.9 | 11.1 | 43.9 | 11.1 | 50.8 |
| G | 103 | 0.18 | 28.0 | 26.9 | 18.7 | 51.5 | 18.7 | 50.9 |

It will be seen from these data that the polymer samples produced with an organometallic compound present during the polymerization are appreciably more resistant to discoloration upon exposure to heat and light than those prepared without the organometallic compound present during polymerization.

Any organometallic compound capable of reacting with oxygen, i.e., any of those compounds corresponding to the general formula presented above may be employed. Examples of suitable compounds in addition to triisobutyl-aluminum include: triethylaluminum, triphenylaluminum, diethylaluminum hydride, diethylphenylaluminum, trimethylboron, tri-n-propylboron, dimethylboron hydride, tri-p-tolylboron, trimethylgallium, methylgallium dihydride, triethylindium, dimethylethylphosphine, dimethylphenylphosphine, tripropylphosphine, trimethylstibine, dimethylphenylstibine, triethylbismuth, triisobutylbismuth, methylarsine, diphenylarsine, and the like.

Since the amount of the organometallic compound required is that quantity necessary to react with the traces of oxygen present, the amount to be added to the monomer will be very small, but will vary depending upon the amount of oxygen present in the monomer or in the polymerization system. Fairly fresh monomer which has not had much opportunity to absorb oxygen requires the addition of only very minute quantities for effective stabilization of the polymer whereas proportionately larger quantities have to be incorporated into monomer which has been shipped from one location to another and been stored for comparatively long periods of time prior to polymerization. The quantity of oxygen in the monomer may be analytically determined in a simple manner and the amount of the organometallic additive calculated on this basis. Under the polymerization conditions usually employed for mass or bulk polymerization, i.e., when the polymerization is effected under an atmosphere of inert gas, the maximum amount of organometallic additive will be that required to react with a saturated solution of the monomer in equilibrium with air. For vinyl aromatic monomers, amounts in the range from about 0.00002% to 0.4% by weight of the monomer will be generally satisfactory. Preferably, amounts in the range from about .02% to 0.2% by weight of monomer are preferred. Any excess over that necessary for reaction is to be avoided since the organometallic compounds employed if they do not react with oxygen, can alter the normal course of the polymerization reaction.

The vinyl aromatic hydrocarbons to which the process of the invention is applicable in addition to styrene include α-methylstyrene, ring-alkylated styrenes and ring-chlorinated styrenes, ethylvinylbenzene, divinylbenzene, vinylnaphthalene, and the like. Copolymers of any two or more of such aralkyl vinyl aromatic hydrocarbons with each other or with styrene may also be prepared by the process of the invention.

The temperature to which the polymerizable vinyl aromatic hydrocarbon is heated to effect polymerization will vary depending upon the monomer used and the method of polymerization employed, i.e., whether the polymerization is thermal or catalytic, mass or emulsion, etc. Generally, temperatures in the range from 50° C. to 150° C. are employed.

The polymerization may be conducted either in the presence or absence of polymerization catalysts. Preferred catalysts for the polymerization include those of the free-radical type and particularly peroxide catalysts such as benzoyl peroxide, lauroyl peroxide, and the like.

Although the process of the invention is especially advantageous in mass or bulk polymerization, it can also be employed to effect improvements in vinyl aryl polymers produced by means of suspension, solution, and emulsion polymerization so long as the organometallic compound employed is not reactive with water or other solvents or diluents which may be used in such systems.

What is claimed is:

1. A process for preparing polymers of styrene having improved heat and light stability which consists of incorporating in styrene monomer containing minor amounts of oxygen an organoaluminum compound of the general formula

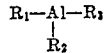

in which $R_1$ and $R_2$ are chosen from the group consisting of hydrogen and alkyl and aryl radicals having from 1 to 8 carbon atoms and $R_2$ is chosen from the group consisting of alkyl and aryl radicals having from 1 to 8 carbon atoms, said organoaluminum compound being incorporated in an amount sufficient to react with said oxygen contained in said styrene monomer, and thereafter polymerizing said styrene monomer in an inert atmosphere by a free-radical mechanism.

2. A process for preparing polymers of styrene having improved heat and light stability which consists of incorporating in styrene monomer containing minor amounts of oxygen an amount of triisobutylaluminum sufficient to react with said oxygen contained therein and thereafter polymerizing said styrene monomer by heating it at a temperature in the range from about 80° C. to about 150° C. in the substantial absence of air.

References Cited in the file of this patent

UNITED STATES PATENTS

| | | |
|---|---|---|
| 2,699,457 | Ziegler et al. | Jan. 11, 1955 |
| 2,882,263 | Natta et al. | Dec. 12, 1955 |

FOREIGN PATENTS

| | | |
|---|---|---|
| 538,782 | Belgium | May 6, 1956 |

OTHER REFERENCES

Furukawa et al.: Journal of Polymer Science, volume 28, pages 227–9, February 1958.

Furukawa et al.: Journal of Polymer Science, volume 36, page 279, April 1959.